May 14, 1957     H. M. BARTON, JR     2,792,501
ANALYZER

Filed Dec. 30, 1953     5 Sheets-Sheet 1

INVENTOR.
H. M. Barton, Jr.
BY Hudson & Young
ATTORNEYS

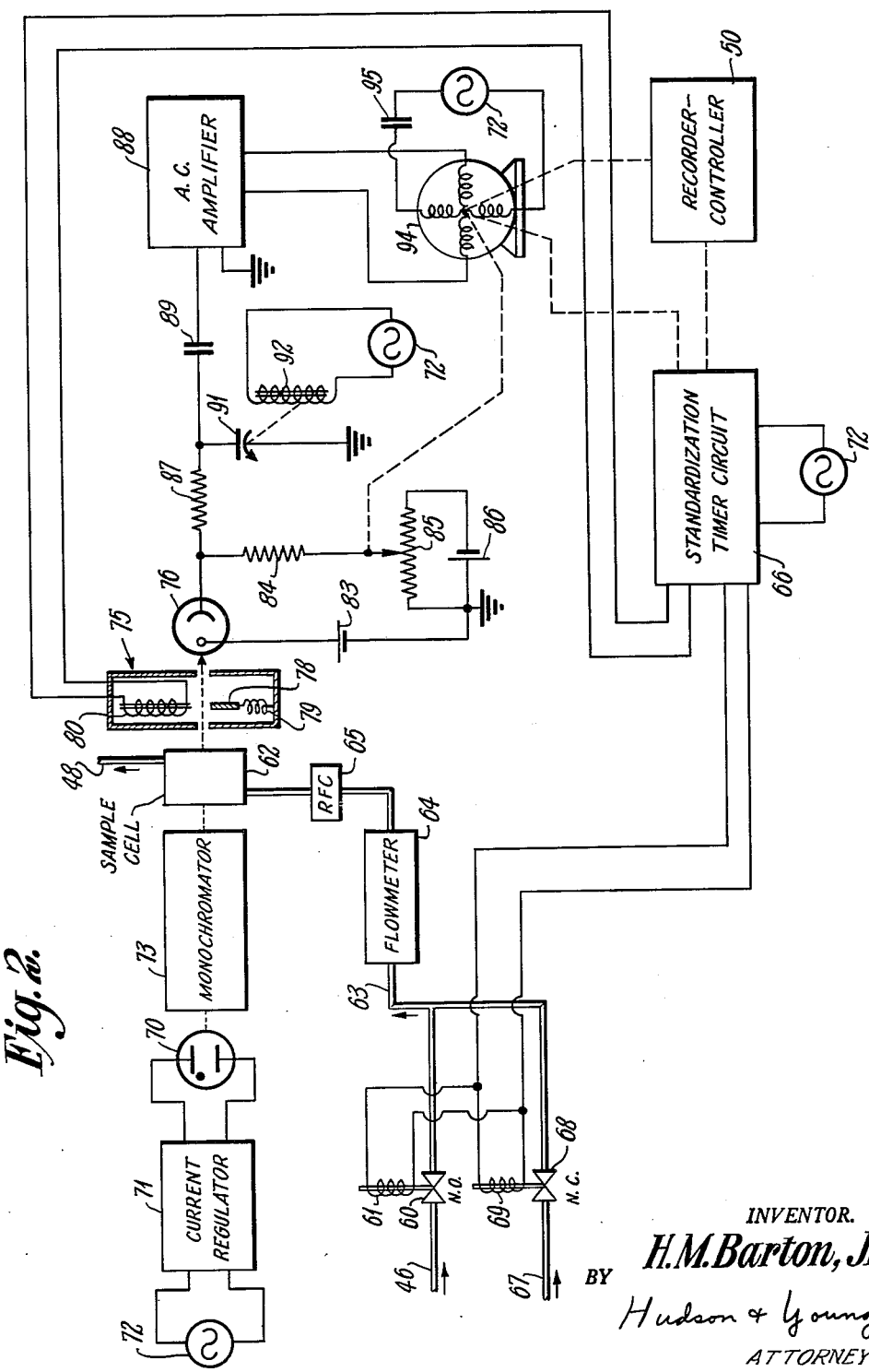

May 14, 1957 H. M. BARTON, JR 2,792,501
ANALYZER
Filed Dec. 30, 1953 5 Sheets-Sheet 3
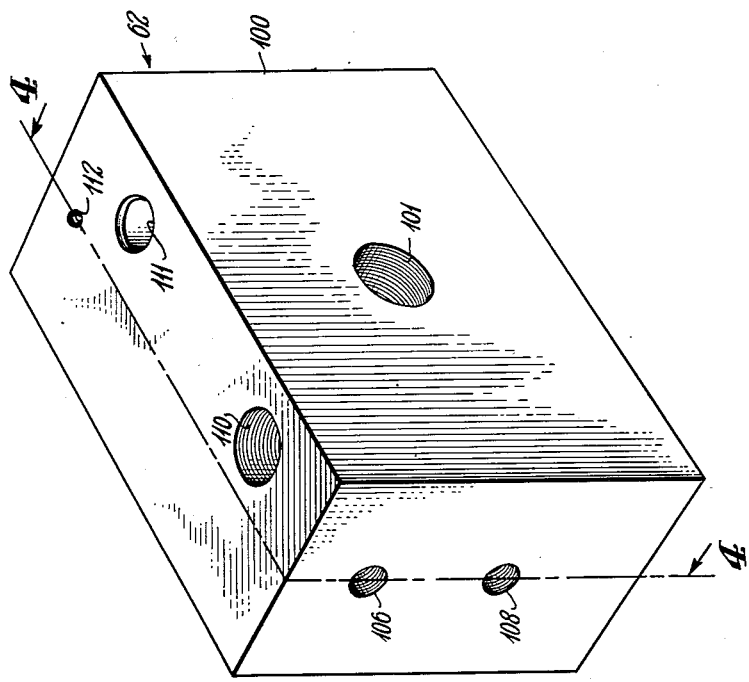
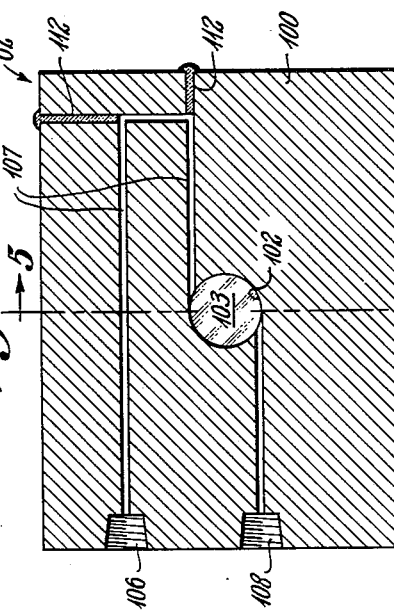
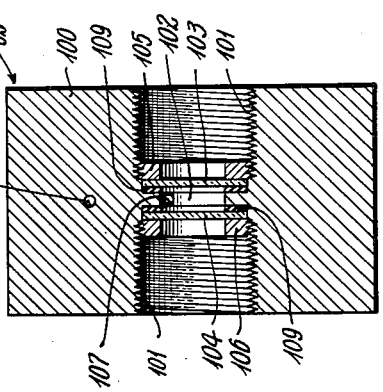
INVENTOR.
*H. M. Barton, Jr.*
BY
Hudson & Young
ATTORNEYS

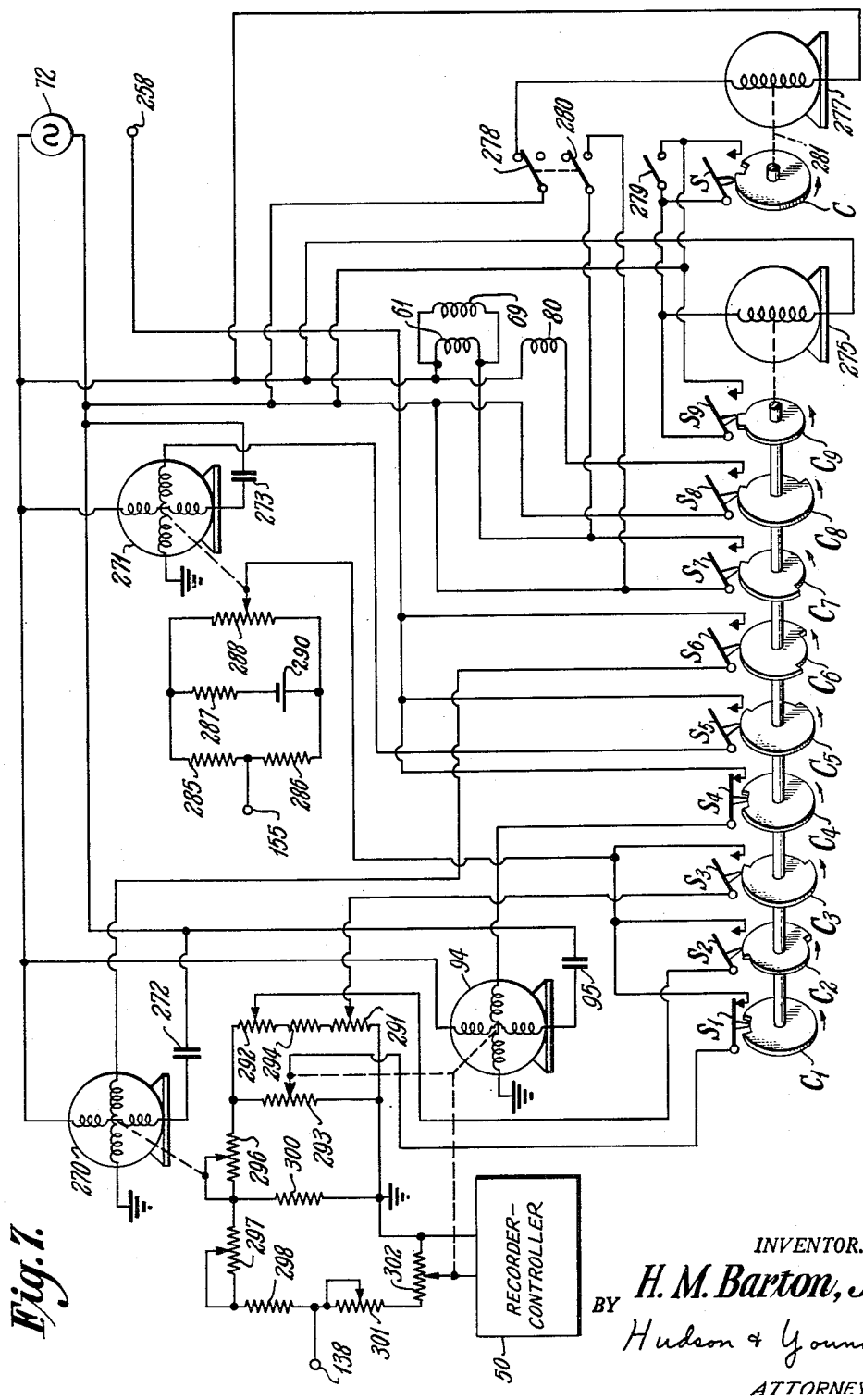

United States Patent Office 2,792,501
Patented May 14, 1957

2,792,501

ANALYZER

Hugh M. Barton, Jr., Bartlesville, Okla., assignor to Phillips Petroleum Company, a corporation of Delaware Application December 30, 1953, Serial No. 401,358

14 Claims. (Cl. 250—43.5)

This invention relates to the analysis of materials by means of the radiation absorption properties thereof.

It is known that certain materials have the property of absorbing electromagnetic radiation of wave lengths which are characteristic of the particular material. These wave length-absorption relations are referred to as the absorption spectrum of the material and this absorption property has been utilized as the basis for a number of analysis systems. For example, radiation of wave lengths corresponding to the absorption spectrum of a particular substance can be passed through a sample material to be analyzed. The resulting transmitted radiation is measured whereby the presence of the particular substance under consideration is indicated by a reduction in the transmitted radiation. An analysis system of this type is particularly useful, for example, in measuring the concentration of butadiene in a fluid sample stream because butadiene strongly absorbs radiation in the general region of approximately 200 to 245 millimicrons, this region being in the ultraviolet region. It has been proposed to control fractionation columns wherein butadiene is one of the components being separated by analyzing sample streams in terms of the radiation absorption properties of the butadiene. Such an analysis can be made in a laboratory, but this procedure is not practical since more time is required to transport the samples to the laboratory than is consumed in making the actual analysis. To overcome this difficulty it is proposed to analyze a sample stream in a continuous manner by means of an analyzer which measures the ultraviolet radiation absorbed by the butadiene present in the sample stream.

It has been found, however, that the commercially available ultraviolet analyzers do not have the accuracy needed for precise control operations. One particular difficulty is a definite and noticeable drift caused by factors which include: variations in temperature of the sample being analyzed and drift in the accompanying amplifier. In most analysis systems of this type the transmitted radiation is measured by a radiation responsive device that establishes an electrical signal of magnitude proportional to the total radiation impinging thereon. However, these established electrical signals generally must be amplified before being of sufficient magnitude to be detected readily or to actuate control mechanism. This amplification has been a decided problem.

In order to overcome these difficulties, an analyzer is provided in accordance with this invention wherein the output unidirectional currents are converted into alternating currents of magnitude proportional thereto by means of a vibrating capacitor, the capacitance of which is varied at a predetermined frequency. The resulting alternating voltages appearing across the capacitor are amplified and applied to a two-phase servomotor which adjusts a variable balance voltage that is applied in opposition to the detected signal in order to reduce the net voltage to zero. The rotation of the motor required to restore this balanced condition is an indication of the radiation impinging upon the detector, and this in turn is a measurement of the concentration of the particular substance being detected. In addition, an automatic standardization circuit is provided which calibrates the analyzer periodically both as to the zero point and the full scale deflection of the associated recorder. Furthermore, manually operated switching means are provided to check the amplifier circuitry and the detecting element when required.

Accordingly, it is an object of this invention to provide improved apparatus for analyzing a stream of material by the radiation absorption properties thereof.

Another object is to provide an optical analysis system incorporating a servo balance system and means for converting unidirectional currents into alternating currents for amplification purposes.

Various other objection, advantages and features of this invention should become apparent in the following detailed description taken in conjunction with the accompanying drawings in which:

Figure 2 is a schematic circuit diagram of the analyzer employed to control the fractionation column of Figure 1;

Figure 3 illustrates the sample cell employed in the analyzer of Figure 2;

Figure 4 is a sectional view taken along line 4—4 in Figure 3;

Figure 5 is a sectional view taken along line 5—5 in Figure 4;

Figure 7 is a schematic view of the balance and standardization circuit of the analyzer of Figure 2.

Figure 1:
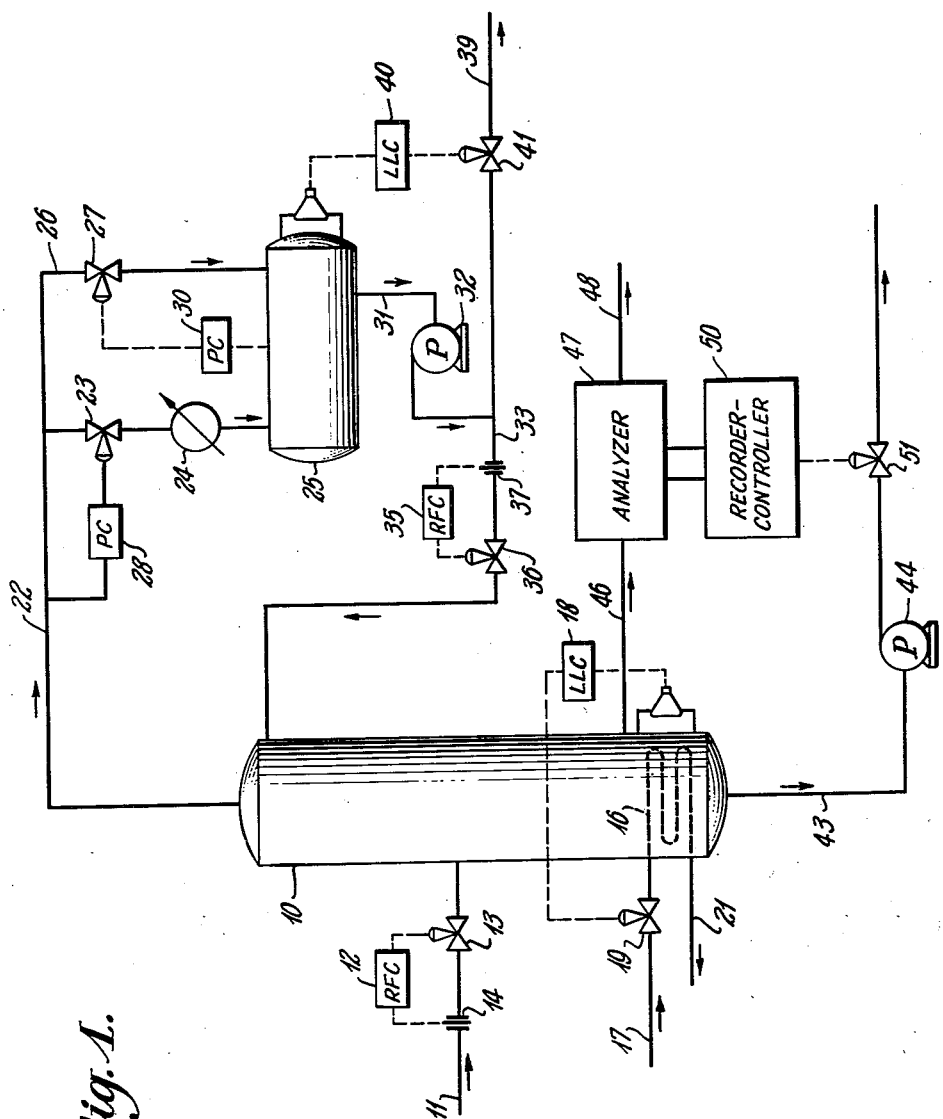
Figure 1 is a schematic view of a fractionation column having the analyzer of the present invention employed therewith to provide automatic controls.

Referring now to the drawing in detail and to Figure 1 in particular, there is shown a fractionation column 10 which is supplied with an input feed stream by a line 11 which enters an intermediate section of column 10. The feed stream enters the column at a predetermined rate which is maintained by a rate-of-flow controller 12 which adjusts a valve 13 in line 11 in response to the pressure differential across an orifice 14 in line 11 upstream from valve 13. Heat is supplied to column 10 by a steam coil 16 disposed within the lower portion of the column. Steam is passed into coil 16 through a line 17 at a rate which is adjusted by a liquid level controller 18 which is actuated by the level of liquid in the bottom of column 10. Controller 18 regulates a valve 19 in line 17 to supply steam at a rate sufficient to maintain a predetermined level of liquid within column 10. The spent steam from coil 16 is removed through an outlet line 21.

A vapor stream is removed from the top of column 10 through a line 22 which passes through a valve 23 and a cooler 24 to a reflux accumulator 25. A second by-pass line 26 having a valve 27 therein communicates between line 22 and reflux accumulator 25. Valve 23 is regulated by a pressure controller 28 which adjusts valve 23 in response to the pressure in line 22, and valve 27 is regulated by a pressure controller 30 which adjusts valve 27 in response to the pressure within accumulator 25. Valves 23 and 27 thus control the relative amount of overhead vapor that is condensed by cooler 24 so as to maintain a desired operating pressure on the top of column 10. The condensed vapor in accumulator 25 is removed through a line 31 having a pump 32 therein. A portion of the liquid pumped through line 31 passes through a reflux line 33 back into the upper portion of column 10. A constant rate of flow is maintained in line 33 by a rate-of-flow controller 35 which adjusts a valve 36 in line 33 in response to the pressure differential across an orifice 37 disposed in line 33 upstream form valve 36. The remainder of the liquid passed through line 31 passes through an overhead product line 39. The rate of flow through line 39 is maintained at a value which is a function of the level of liquid in accumulator 25 by means of a liquid level controller 40 which adjusts a valve 41 in line 39 in response to the liquid level in accumulator 25.

A kettle product is removed from column 10 by a line 43 having a pump 44 therein. A sample stream is removed from the lower portion of column 10 through a line 46 which communicates with the ultraviolet analyzer 47 of this invention. From analyzer 47, this sample stream is vented through a line 48. Analyzer 47 provides an output signal which is a function of the composition of the sample stream removed from column 10 through line 46. If column 10 is employed to separate a mixture of butenes from butadiene, then analyzer 47 can provide an output signal that is a function of the concentration of butadiene in the sample stream. The output signal from analyzer 47 is applied to a recorder-controller 50 which in turn regulates a valve 51 disposed in kettle product line 43. The rate of withdrawal of the kettle product is thus maintained at a value sufficient to maintain the concentration of butadiene in the sample stream removed through line 46 constant at a predetermined value. In this manner, the operation of column 10 is regulated to provide kettle product streams of desired composition.

Analyzer 47 is shown schematically in Figure 2. The sample stream removed through line 46 is passed through a valve 60 which is operated by a solenoid 61. Valve 60 normally is open to allow the sample stream to pass therethrough, to a sample cell 62 through a line 63 having a flowmeter 64 and a rate-of-flow controller 65 therein. A second line 67 communicates with line 63 through a valve 68 which is operated by a solenoid 69. Line 67 communicates with a source of reference fluid, not shown, such as air which is employed to standardize the analyzer periodically. Valve 68 normally is closed. Solenoids 61 and 69 are connected in parallel circuit relation such that valve 68 is opened when valve 60 is closed, and vice versa. The operation of solenoids 61 and 69 is controlled by a standardization timer circuit 66 which is energized by a source of alternating current 72.

When the analyzer is employed to detect the presence of butadiene, the radiation employed is in the ultraviolet region. This radiation can be provided by a hydrogen discharge lamp 70 which is connected across the output terminals of a current regulator circuit 71, the latter being energized from alternating current source 72. The radiation emitted from lamp 70 is directed through a monochromator 73 which limits the transmitted radiation to a selected band of wave lengths. The radiation transmitted by monochromator 73 is directed through a shutter arrangement 75 to impinge on a photoelectric tube 76. Shutter 75 can be in the form of an opaque metallic plate 78 which normally is retained out of the path of radiation by a spring 79. A solenoid 80 is provided to attract plate 78 to move the same into the path of radiation. Solenoid 80 also is energized by the standardization timer circuit 66.

The anode of tube 76 is connected to the positive terminal of a voltage source 83, the negative terminal of which is grounded. The cathode of tube 76 is connected to one end terminal of a high ohmic value resistor 84. The second end terminal of resistor 84 is connected to the contactor of a low ohmic value potentiometer 85. One end terminal of potentiometer 85 is connected to the negative terminal of a voltage source 86, the positive terminal of which is grounded, and the second end terminal of potentiometer 85 is grounded. The cathode of tube 76 also is connected to one end terminal of a resistor 87. The second end terminal of resistor 87 is connected to one input terminal of an alternating current amplifier 88 through a capacitor 89 and to ground through a vibrating capacitor 91. One plate of capacitor 91 is mechanically coupled to a solenoid 92 which is energized by alternating current source 72. In the manner, one of plates of capacitor 91 is moved with respect to the second plate at the frequency of current source 72. This in turn varies the capacity of capicitor 91 at a predetermined frequency. The second input terminal of amplifier 88 is grounded. The output terminals of amplifier 88 are connected across a first winding of a two-phase reversible servomotor 94. The second winding of motor 94 is connected in series with current source 72 and a capacitor 95. The drive shaft of motor 94 is mechanically coupled to the contactor of potentiometer 85 to move this contactor in response to the signal being applied to motor 95 from amplifier 88.

The direct current flow through tube 76, which is a function of the radiation impinging upon the cathode thereof, passes through high ohmic value resistor 84 and the portion of potentiometer 85 between the contactor thereof and ground. The resistance of potentiometer 85 is negligible in comparison with the resistance of resistor 84 so that the voltage developed by current flow through tube 76 appears across resistor 84. For example, resistor 84 can be of the order of 100,000 megohms while the total resistance of potentiometer 85 is of the order of 400 ohms. The RC network of resistor 87 and vibrating capacitor 91 is connected in parallel with resistor 84. When the capacitance of capacitor 91 changes due to the vibration of one plate thereof, current flows into and out of this element such that an alternating voltage component is generated across capacitor 91. This voltage component is of the same frequency as the frequency of current source 72. The voltage developed across capacitor 91 is amplified by amplifier 88 to drive motor 94 to adjust the contactor setting of potentiometer 85. Motor 94 is connected such that the contactor of potentiomeer 85 is moved to supply a voltage from source 86 sufficient to reduce the potential drop across resistor 84 to zero. Under this condition, there is no voltage developed across capacitor 91 and rotation of motor 94 is terminated. The drive shaft of motor 94 also is mechanically coupled to recorder-controller 50 so that the rotation of motor 94 is recorded continuously. This rotation of motor 94 is a function of the radiation impinging upon tube 76, which in turn is a function of the composition of the sample stream directed through cell 62.

The standardization timer circuit 66, which is described in detail hereinafter, energizes solenoids 61 and 69 periodically to terminate the flow of sample from line 46 into cell 62 and to pass the standardization fluid into cell 62 in place thereof. At this time, motor 94 is disconnected and a standardization circuit, which also is described in detail hereinafter, is energized to standardize the analyzer.

Sample cell 62 is shown in detail in Figures 3, 4 and 5. This cell preferably is formed of a metallic block 100 having fairly good heat conducting properties. A central passage 101 is formed in block 100 to allow the passage of radiation therethrough. As shown in Figure 5, this passage comprises a central region 102 of smaller diameter than the outer portions. Transparent windows 103 and 104 are disposed across the two ends of passage 102 and retained in place by respective threaded rings 105 and 106 and gaskets 109. Windows 103 and 104 are formed of a material transparent to the radiation employed. When ultraviolet radiation is used, these windows can be made of quartz, for example. The sample of material to be analyzed is directed from line 63 into an inlet opening 106 in block 100. The sample then circulates through an elongated path 107 and enters passage 102. From passage 102, the sample is vented through an outlet opening 108. If it is desired to lengthen region 102 of the cell passage, this can be accomplished by positioning annular spacers, not shown, between region 102 and windows 103 and 104. A well 110 is provided in block 100 to receive a heating element, not shown, and a second well 111 is provided to receive a thermostat, also not shown. These last two elements are connected in circuit with a source of heating current to maintain the temperature of block 100 at a constant value. The purpose of the elongated path 107 is to allow the inlet sample to acquire the constant temperature of block 100 before passing into region 102. As shown in Figure 4, this elongated passage can be formed by drilling into block 100 from several points. Plugs 112 are then inserted into the drilled holes to complete passage 107.

Figure 6:
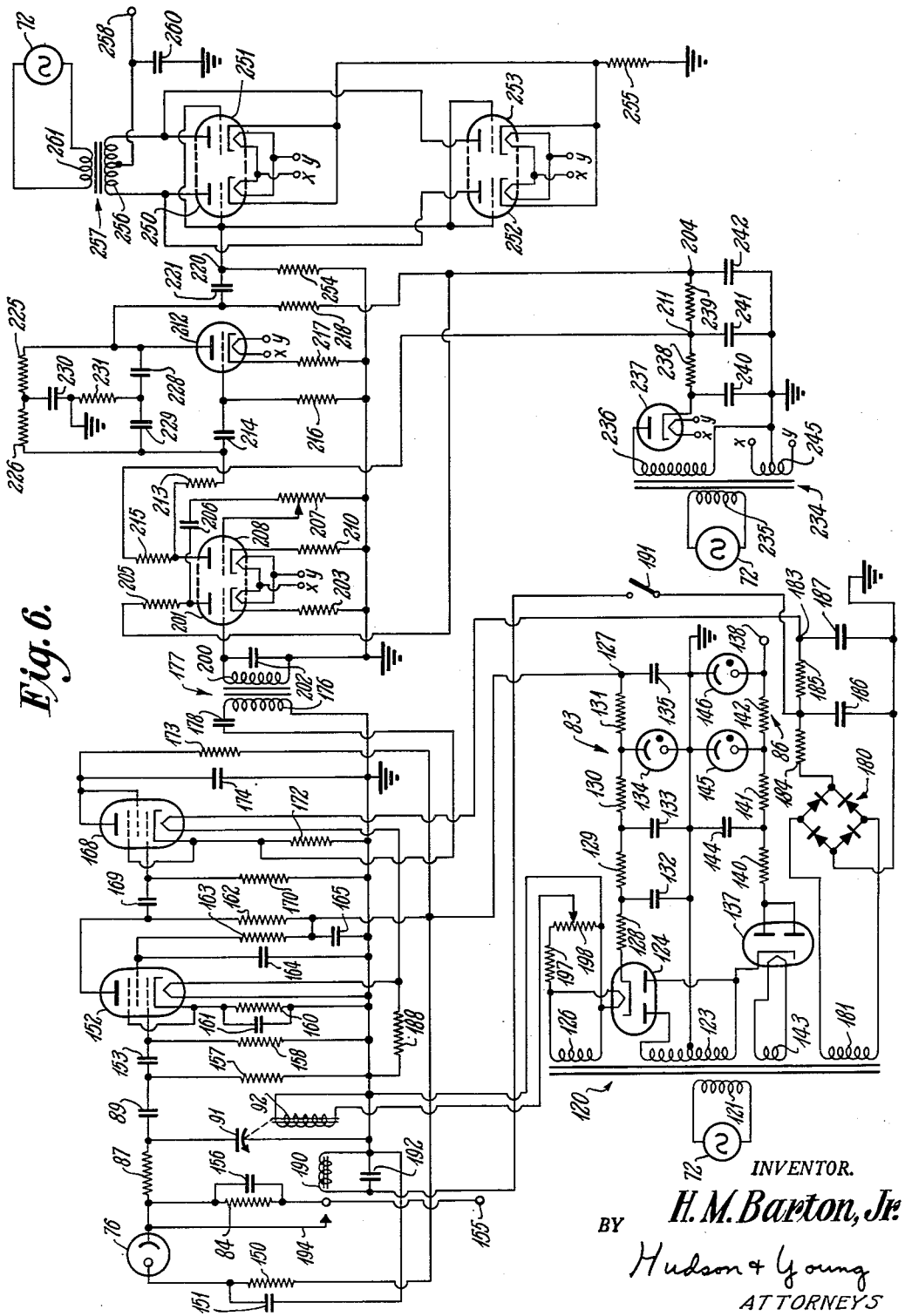
Figure 6 is a detailed circuit diagram of the amplifier employed to measure the output signal of the photoelectric tube detector.

Amplifier 88 is shown in detail in Figure 6. The positive potential applied to the anode of tube 76, voltage 83, is supplied by a power supply circuit which includes a transformer 120 having its primary winding 121 connected across current source 72. The end terminals of the first secondary winding 123 of transformer 120 are connected to the respective anodes of a double diode 124. The center tap of transformer winding 123 is maintained at ground potential. The filament of double diode 124 is connected across a second secondary winding 126 of transformer 120. The common cathode of double diode 124 is connected to a potential terminal 127 through series connected resistors 128, 129, 130 and 131. A capacitor 132 is connected between ground and the junction between resistors 128 and 129, and a capacitor 133 is connected between ground and the junction between resistors 129 and 130. A voltage regulating tube 134 is connected between ground and the junction between resistors 130 and 131. A capacitor 135 is connected between potential terminal 127 and ground. Resistors 128, 129, 130 and 131, capacitors 132, 133 and 135 and voltage regulating tube 138 thus form a filter circuit in the output of diode 124 to maintain a constant positive potential taken with respect to ground, at terminal 127.

A source of negative potential corresponding to battery 86 is provided by a second double diode 137. The common cathode of double diode 137 is connected to one end terminal of transformer winding 123, and the two anodes of diode 137 are connected to one another and to a potential terminal 138 through series-connected resistors 140, 141 and 142. The filament of diode 137 is connected across a third secondary transformer winding 143 of transformer 120. A capacitor 144 is connected between ground and the junction between resistors 140 and 141, a voltage regulating tube 145 is connected between ground and the junction between resistors 141 and 142, and a voltage regulating tube 146 is connected between ground and potential terminal 138. Resistors 140, 141 and 142, capacitor 144 and voltage regulating tubes 145 and 146 thus form a filter circuit connected in the output of diode 137 to maintain a constant negative potential, taken with respect to ground, at terminal 138.

The anode of tube 76 is connected to positive potential terminal 127 through a resistor 150, and a capacitor 151 is connected between the anode of tube 76 and ground. The cathode of tube 76 is connected to the control grid of a first vacuum tube pentode 152 through resistor 87, capacitor 89 and a capacitor 153, these last three elements being connected in series relation. The cathode of tube 76 also is connected to a terminal 155 through resistor 84 which is shunted by a capacitor 156. Terminal 155 connects the cathode of tube 76 to a balancing potentiometer circuit, shown in Figure 7, which corresponds to potentiometer 85 of Figure 2. Capacitor 91 is connected between ground and the junction between resistor 87 and capacitor 89. The junction between capacitors 89 and 153 is connected to ground through a resistor 157. The control grid of pentode 152 is connected to ground through a resistor 158. The suppressor grid of pentode 152 is connected to the cathode thereof and to ground through a resistor 160 which is shunted by a capacitor 161. The anode of pentode 152 is connected to positive potential terminal 127 through a resistor 162 and the screen grid of pentode 152 is connected to positive potential terminal 127 through a resistor 163. A capacitor 164 is connected between the screen grid of pentode 152 and ground, and a capacitor 165 is connected between potential terminal 127 and ground.

The anode of pentode 152 also is connected to the control grid of a second pentode 168 through a capacitor 169, the control grid of pentode 168 being grounded through a resistor 170. The suppressor grid of pentode 168 is connected to the cathode thereof and to ground through a resistor 172. The anode and screen grid of pentode 168 are connected to positive potential terminal 127 through a resistor 173. A capacitor 174 is connected between the anode of pentode 168 and ground. The cathode of pentode 168 is also connected to one end terminal of the primary winding 176 of an interstage transformer 177 through a capacitor 178, the second end terminal of transformer winding 176 being grounded.

The filaments of pentodes 152 and 168 are energized from a source of direct current provided by a full wave rectifier bridge network 180. First opposite terminals of network 180 are connected across a fourth secondary transformer winding 181 of transformer 120. The third terminal of bridge network 180 is connected to an output terminal 183 through series connected resistors 184 and 185, the fourth terminal of bridge network 180 being grounded. A capacitor 186 is connected between ground and the junction between resistors 184 and 185, and a capacitor 187 is connected between terminal 183 and ground. Resistors 184 and 185 and capacitors 186 and 187 thus filter the output voltage from network 180 to maintain a smooth direct voltage between terminal 183 and ground. This voltage is applied across the series connected filaments of pentodes 152 and 168. A resistor 188 is connected between ground and the junction between the filaments of the two pentodes.

The junction between resistors 184 and 185 is connected to one end terminal of a relay coil 190 through a switch 191, the second terminal of relay coil 190 being grounded. A capacitor 192 is connected in shunt with relay coil 190. Closure of switch 191 thus energizes relay coil 190 to connect one end of a lead 194 to terminal 155. The second end of lead 194 is connected to the cathode of tube 76 such that resistor 84 is short-circuited by closure of switch 191. The purpose of this arrangement is described in detail hereinafter.

Solenoid 92, which vibrates capacitor 91, is energized from transformer winding 126. The end terminals of transformer winding 126 are connected across a potential dividing network comprising a resistor 197 and a potentiometer 198 connected in series relation. The voltage appearing between the contactor and one end terminal of potentiometer 198 is applied across solenoid 92 to cause vibration of capacitor 91.

One terminal of the secondary winding 200 of transformer 177 is connected to the control grid of a first triode 201. The second end terminal of transformer winding 200 is grounded, and a capacitor 202 is connected in parallel with transformer winding 200. The cathode of triode 201 is grounded through a resistor 203, and the anode of triode 201 is connected to a positive potential terminal 204 through a resistor 205. The anode of triode 201 is also connected to one terminal of a capacitor 206, the second terminal of which is connected to the first end terminal of a potentiometer 207. The contactor of potentiometer 207 is connected to the control grid of a second triode 208 and the second end terminal of potentiometer 207 is grounded. The cathode of triode 208 is grounded through a resistor 210. The anode of triode 208 is connected to a second positive potential terminal 211 through a resistor 215. The anode of triode 208 is also connected to the control grid of a third triode 212 through a resistor 213 and a capacitor 214 connected in series relation. The control grid of triode 212 is connected to ground through a resistor 216 and the cathode of triode 212 is connected to ground through a resistor 217. The anode of triode 212 is connected to positive potential terminal 204 through a resistor 218 and to an output terminal 220 through a capacitor 221. The anode of triode 212 is also connected to the junction between resistor 213 and capacitor 214 through a parallel-T feedback filter network which includes a pair of series connected resistors 225 and 226 connected in parallel with a pair of series connected capacitors 228 and 229. The junction between resistors 225 and 226 is connected to ground through a capacitor 230 and the junction between capacitors 228 and 229 is connected to ground through a resistor 231.

The positive potentials at terminals 204 and 211 are supplied by a circuit which includes a transformer 234 having its primary winding 235 connected across current source 72. The anode of a diode 237 is connected to one end terminal of a first secondary winding 236 of transformer 234, the second end terminal of winding 236 being connected to ground. The cathode of diode 237 is connected to terminal 211 through a resistor 238, and a resistor 239 is connected between terminals 211 and 204. A capacitor 240 is connected between the cathode of diode 237 and ground, a capacitor 241 is connected between terminal 211 and ground, and a capacitor 242 is connected between terminal 204 and ground. Diode 237 and the output filter circuit including resistors 238 and 239 and capacitors 240, 241 and 242 thus provide positive voltages to operate triodes 201, 208 and 212. The filaments of these triodes are energized by a second secondary transformer winding 245 of transformer 234 having output terminals $x$ and $y$.

Output terminal 220 of triode 212 is connected to the control grids of each of four triodes 250, 251, 252 and 253. Terminal 220 also is connected to ground through a resistor 254. The cathodes of triodes 250, 251, 252 and 253 are connected to one another and to ground through a common resistor 255. The anodes of triodes 250 and 252 are connected to one another and to one end terminal of the first winding 256 of a transformer 257. The anodes of triodes 251 and 253 are connected to one another and to the second end terminal of transformer winding 256. The center tap of transformer winding 256 is connected to a terminal 258 and to ground through a capacitor 260. The end terminals of the second winding 261 of transformer 257 are connected across current source 72. The filaments of triodes 250, 251, 252 and 253 are energized by transformer winding 245 of transformer 234.

The operation of the circuitry thus far described is such that the direct current signal from tube 76 is converted into a corresponding alternating current signal by vibrating capacitor 91, which signal is amplified by pentodes 152 and 168 and triodes 201, 208 and 212. This alternating signal is of the same frequency as the frequency at which capacitor 91 is vibrated, 60 cycles, for example. It is, therefore, desired that the amplifier transmit only signals of this frequency and not stray signals which may be picked up through stray capacitance or leakage resistance. The parallel-T filter disposed between the anode and control grid of triode 212 is adapted to minimize the transmission of stray voltages of frequencies other than 60 cycles. This filter is tuned to 60 cycles and as such presents high impedance to 60 cycle signals and relatively low impedance to signals of other frequencies. Accordingly, at frequencies other than 60 cycles the parallel-T network provides transmission to apply degenerative feedback to the control grid of triode 212.

The voltage from source 72 applied to the anodes of triodes 250 and 251 through transformer 257 results in these two anodes being positive during alternate half cycles of this applied voltage. In the absence of a signal being applied to the control grids of these two triodes from triode 212, the output of the two tubes consists of two pulses per cycle. If these two pulses are equal, which they normally are because of the balanced circuit, there is no 60 cycle component in the output signal which appears between terminal 258 and ground. However, if a 60 cycle signal, either in phase or 180° out of phase with the operating voltage supplied by source 72, is applied to the control grids of triodes 250 and 251, one of the output pulses from these tubes is increased and the other decreased to provide a 60 cycle component in the output signal. By providing tubes 252 and 253 in parallel with respective tubes 250 and 251 a safety factor is established because if one of the tubes should fail the other will continue the operation. The output signal between terminal 258 and ground operates servomotor 94 and the standardization motors described hereinafter in conjunction with Figure 7.

With reference to Figure 7 there are shown three reversible servomotors 94, 270 and 271. The respective first coils of motors 94, 270 and 271 are connected in series relation with current source 72 through respective capacitors 95, 272 and 273. Corresponding first terminals of each of the respective second coils of these three motors are grounded. The corresponding second terminals of the second coils of motors 94, 270 and 271 are connected to terminal 258 through respective switches $S_4$, $S_6$ and $S_5$. These switches are operated by respective cams $C_4$, $C_6$ and $C_5$ which are rotated in unison by a synchronous motor 275.

Motor 275 rotates nine cams $C_1$–$C_9$ which in turn operate respective switches $S_1$–$S_9$. One terminal of the winding of motor 275 is connected to one terminal of current source 72 and the second terminal of the winding of motor 275 is connected with the second terminal of current source 72 through a switch S which is operated by a cam C. Cam C is in turn rotated by a second synchronous motor 277 which is connected across current source 72 through a normally closed switch 278. A manually operated switch 279 is connected in parallel with cam operated switch S. Motor 277 makes one revolution in a predetermined time interval, which can be one hour, for example. During approximately three minutes of this hour, switch S is closed to energize motor 275. One rotation of motor 275 requires approximately three minutes.

Shutter solenoid 80 is connected across current source 72 through switch $S_8$. Parallel connected valve solenoids 61 and 69 are connected across current source 72 through switch $S_7$. A normally open switch 280 is connected in parallel with cam operated switch $S_7$ and is mechanically coupled to switch 278 such that switch 278 is opened when switch 280 is closed. Motor 275 also is connected across current source 72 through switch $S_9$.

Terminal 155 which is connected to the cathode of tube 76 through resistor 84, Figure 1, is connected to first end terminals of resistors 285 and 286, Figure 7. The second end terminal of resistor 285 is connected to the first end terminal of resistor 287 and to the first end terminal of a potentiometer 288. The second end terminal of resistor 286 is connected to the second end terminal of potentiometer 288 and to the positive terminal of a voltage source 290. Voltage source 290 facilitates zero adjustment of the instrument. The negative terminal of voltage source 290 is connected to the second end terminal of resistor 287. The drive shaft of motor 271, which is hereinafter referred to as the zero balance motor, is mechanically coupled to the contactor of potentiometer 288. The contactor of potentiometer 288 is connected through switch $S_3$ to the contactor of a potentiometer 291, through switch $S_2$ to the contactor of a potentiometer 292, and through switch $S_1$ to the contactor of a potentiometer 293. A resistor 294 is connected between first end terminals of potentiometers 291 and 292. The second end terminals of potentiometer 291 and 292 are connected to respective end terminals of potentiometer 293. One end terminal of potentiometer 293 is grounded and the second end terminal thereof is connected to negative voltage terminal 138 through variable resistors 296, 297 and a resistor 298, these last three resistors being connected in series relation. A resistor 300 is connected between ground and the junction between resistors 296 and 297. The movable arm of resistor 296 is mechanically coupled to the drive shaft of motor 270, which is referred to hereinafter as the standardization motor. Negative voltage terminal 138 is connected to ground through a variable resistor 301 and a potentiometer 302. The contactor of potentiometer 302 is connected to one input terminal of recorder-controller 50, the second input terminal of which is grounded. The contactors of potentiometers 293 and 302 are mechanically coupled to one another and to the control shaft of motor 90, which is referred to hereinafter as the balance motor.

Motor 277 normally is connected across current source 72 through switch 278 so as to run continuously. During the time that the analysis is being made the sample stream removed from column 10 through line 46 is directed into sample cell 62 through open valve 60. At this time, the standardization circuit which is actuated by motor 275 remains inoperative. The switch positions illustrated in Figure 7 indicate conditions immediately prior to the standardization cycle being energized. At the beginning of the standardization cycle, motor 277 rotates cam C to close switch S to energize motor 275. This rotates the nine cams in the illustrated counterclockwise direction such that switch S9 closes almost immediately to short-circuit switch S whereby motor 275 remains energized until the standardization cycle is completed.

During the first step of the standardization cycle, which step occurs almost immediately following closure of switch S, switch S4 is opened to disconnect balance motor 94 from terminal 258. Simultaneously or very shortly thereafter, switch S7 closes to energize solenoids 61 and 69. This disconnects sample line 46 from sample cell 62 and connects standardization line 67 with cell 62. A reference gas having known or zero adsorption characteristics is then passed through sample cell 62. Simultaneously with this last step or shortly thereafter, switch S8 closes to energize solenoid 80 to close shutter 75. Then switch S1 opens and switch S3 closes to disconnect potentiometer 293 from potentiometer 288 and to connect potentiometer 291 in place thereof. The setting of potentiometer 291 represents the zero setting of the instrument with no radiation impinging upon tube 76. Following this, switch S5 closes to connect zero balance motor 271 to the output 258 of amplifier 88. At this point there should be no rotation of motor 271 because no radiation impinges tube 276. However, if there is any rotation of motor 271 due to the "dark tube" current flow, then potentiometer 288 is adjusted to eliminate this rotation. This in effect establishes the zero calibration point on the instrument. The foregoing first-mentioned steps can occur either simultaneously or at short intervals in the order named.

Following approximately one minute, switch S5 is once again opened to disconnect zero balance motor 271 from the output of amplifier 88. Switch S3 is once again opened to disconnect potentiometer 291 from potentiometer 288 and switch S2 is closed to connect potentiometer 292 to potentiometer 288. Switch S8 is once again opened to deenergize solenoid 80 to open shutter 75. Switch S6 is closed to connect standardization motor 270 to the output of amplifier 88. Under these conditions, the standardization fluid is circulated through cell 62 such that the radiation impinging upon tube 76 is at a maximum if the standardization fluid is non-absorbing. The recorder should then indicate 100 percent transmission through the sample cell, and motor 270 adjusts resistor 296 if necessary to bring the recorder position to this 100 percent mark. The foregoing second-mentioned steps can occur either simultaneously or in the order named.

After a second delay of approximately one minute, switch S6 is opened to disconnect standardization motor 270 from the amplifier output. Switch S7 is once again opened to deenergize solenoids 61 and 69 to disconnect the standardization fluid from cell 62 and to connect the sample stream in place thereof. After approximately one additional minute, cell 62 is sufficiently purged of the standardization gas that the analysis can be continued. Switch S2 is once again opened and switch S1 closed to disconnect potentiometer 292 from potentiometer 288 and to connect potentiometer 293 in circuit with potentiometer 288. Switch S4 closes once again to connect balance motor 94 back into the circuit. At this time switch S9 opens once again, as does switch S, so that the circuit to motor 275 is broken, thereby terminating rotation of motor 275. This completes the standardization cycle.

Switches 278 and 280 are provided such that standardization gas can be passed into cell 62 at any time it is desired to check the instrument. Closure of switch 280 and opening of switch 278 accomplishes this result immediately without the delay of the standardization cycle. The amplifier circuit can be checked at any time by closing switch 191, Figure 6, to short-circuit tube 76.

From the foregoing description of this invention it should become apparent that there is provided an improved analyzer wherein direct current signals are converted to alternating current signals for purposes of amplification by a vibrating capacitor. A calibration system is provided which adjusts both the zero point on the recorder as well as the full scale deflection. This calibration is performed periodically in an automatic manner. While the invention has been described in conjunction with a present preferred embodiment it should be obvious that the invention is not limited thereto.

What is claimed is:

1. An analyzer comprising, in combination, a source of radiation, a sample cell through which radiation from said source is directed, means positioned in the path of radiation transmitted through said cell to provide an electrical signal of amplitude proportional to the radiation transmitted through said cell, a capacitor, means to apply a voltage across said capacitor of magnitude proportional to the amplitude of said signal, means to vary the capacitance of said capacitor at a predetermined frequency, and alternating current detecting means having the input terminals thereof connected across said capacitor.

2. A photometric analyzer comprising, in combination, a source of radiation, a sample cell through which radiation from said source is directed, a photoelectric tube which conducts current of magnitude proportional to the radiation impinging thereon, said tube being disposed in the path of radiation transmitted through said cell, a capacitor, means connected in circuit with said tube to apply a voltage across said capacitor of magnitude proportional to the current flow through said tube, means to vary the capacitance of said capacitor at a predetermined frequency, and alternating current detecting means having the input terminals thereof connected across said capacitor.

3. A photometric analyzer comprising, in combination; a source of ultraviolet radiation; a sample cell having windows transparent to ultraviolet radiation; a monochromator to pass ultraviolet radiation of selected wave lengths; a photoelectric tube which conducts current of magnitude proportional to the radiation impinging thereon; said cell, said monochromator and said tube being positioned such that radiation from said source passes through said monochromator and said cell to said tube; a capacitor; means connected in circuit with said tube to apply a voltage across said capacitor of magnitude proportional to the current flow through said tube; means to vary the capacitance of said capacitor at a predetermined frequency; and alternating current detecting means having the input terminals thereof connected across said capacitor.

4. An analyzer comprising, in combination, a source of radiation, a sample cell through which radiation from said source is directed, means positioned in the path of radiation transmitted through said cell to establish an output voltage of magnitude proportional to the radiation transmitted through said cell, a first resistor, a potentiometer, the first terminal of said resistor being connected to the contactor of said potentiometer, a voltage source applied across the end terminals of said potentiometer, said output voltage being applied across the second terminal of said first resistor and the first end terminal of said potentiometer, a second resistor having its first terminal connected to said second terminal of said first resistor, a capacitor having its first terminal connected to the second terminal of said second resistor, the second terminal of said capacitor being connected to said first end terminal of said potentiometer, means to vary the capacitance of said capacitor at a predetermined frequency, a servomotor coupled to the contactor of said potentiometer, and means to energize said servomotor in response to the voltage across said capacitor whereby said servomotor moves the contactor of said potentiometer until rotation of said servomotor is terminated.

5. A photometric analyzer comprising, in combination, a source of radiation, a sample cell through which radiation from said source is directed, a photoelectric tube which conducts current of magnitude proportional to the radiation impinging thereon, said tube being disposed in the path of radiation transmitted through said cell, a first resistor, a potentiometer, the first terminal of said resistor being connected to the contactor of said potentimeter, a voltage source applied across the end terminals of said potentiometer, the output terminals of said tube being applied across the second terminal of said first resistor and the first end terminal of said potentiometer, a second resistor having its first terminal connected to said second terminal of said first resistor, a capacitor having its first terminal connected to the second terminal of said second resistor, the second terminal of said capacitor being connected to said first end terminal of said potentiometer, means to vary the capacitance of said capacitor at a predetermined frequency, a servomotor coupled to the contactor of said potentiometer, and an amplifier having its input terminals connected to the respective terminals of said capacitor, the output terminals of said amplifier being connected to said servomotor whereby said servomotor moves the contactor of said potentiometer until rotation of said servomotor is terminated.

6. An analyzer comprising, in combination, a source of radiation, a sample cell through which radiation from said source is directed, means positioned in the path of radiation transmitted through said cell to establish an output voltage of magnitude proportional to the radiation transmitted through said cell, a first resistor, second and third resistors connected in series relation, the first terminal of said first resistor being connected to the junction between said second and third resistors, a first potentiometer, the end terminals of said first potentiometer being connected to respective end terminals of the series connected said second and third resistors, a first voltage source applied across said first potentiometer, a second potentiometer, the contactor of said second potentiometer being connected to the contactor of said first potentiometer, a variable resistor, the first end terminal of said variable resistor being connected to the first end terminal of said second potentiometer, a second voltage source applied between the second end terminal of said variable resistor and the second end terminal of said second potentiometer, said output voltage being applied between the second terminal of said first resistor and said second end terminal of said second potentiometer, a fourth resistor having its first terminal connected to said second terminal of said first resistor, a capacitor having its first terminal connected to the second terminal of said fourth resistor, the second terminal of said capacitor being connected to said second end terminal of said second potentiometer, means to vary the capacitance of said capacitor at a predetermined frequency, a servomotor coupled to the contactor of said second potentiometer, and means to energize said servomotor in response to the voltage across said capacitor whereby said servomotor moves the contactor of said potentiometer until rotation of said servomotor is terminated.

7. The combination in accordance with claim 6 further comprising a second servomotor coupled to the contactor of said first potentiometer, a third servomotor coupled to the arm of said first variable resistor, and switching means to connect said second and third servomotors selectively to said last-mentioned means in claim 6 in place of said first-mentioned servomotor whereby rotation of any one of said servomotors adjusts the circuit element coupled thereto until rotation of the servomotor is terminated.

8. The combination in accordance with claim 7 further comprising a radiation opaque shutter, means to pass a sample stream to be analyzed through said cell, means to pass a stream of predetermined composition through said cell, means to position said shutter in the path of radiation between said source of radiation and said tube; and means to actuate said switching means whereby said first-mentioned servomotor is connected to said last-mentioned means in claim 6 when said sample stream is passed through said cell, said second servomotor is connected to said last-mentioned means in claim 6 when said shutter is positioned between said source of radiation and said tube, and said third servomotor is connected to said last-mentioned means in claim 6 when said stream of predetermined composition is passed through said cell.

9. The combination in accordance with claim 8 wherein said means to actuate said switching means comprises a timing motor coupled to said switching means whereby the switching steps of claim 8 are performed automatically sequentially.

10. The combination in accordance with claim 9 further comprising additional switching means to pass said stream of predetermined composition through said cell during any selected portion of the automatic switching cycle.

11. Detecting apparatus to measure the magnitude of direct current voltages comprising, in combination, a first resistor, second and third resistors connected in series relation, the first terminal of said first resistor being connected to the junction between said second and third resistors, a first potentiometer, the end terminals of said first potentiometer being connected to respective end terminals of the series-connected said second and third resistors, a first voltage source applied across said first potentiometer, a second potentiometer, the contactor of said second potentiometer being connected to the contactor of said first potentiometer, a variable resistor, the first end terminal of said variable resistor being connected to the first end terminal of said second potentiometer, a second voltage source applied between the second end terminal of said variable resistor and the second end terminal of said second potentiometer, said direct current voltage being applied between the second terminal of said first resistor and said second end terminal of said second potentiometer, a fourth resistor having its first terminal connected to said second terminal of said first resistor, a capacitor having its first terminal connected to the second terminal of said fourth resistor, the second terminal of said capacitor being connected to said second end terminal of said second potentiometer, means to vary the capacitance of said capacitor at a predetermined frequency, a servomotor coupled to the contactor of said second potentiometer, and means to energize said servomotor in response to the voltage across said capacitor whereby said servomotor moves the contactor of said potentiometer until rotation of said servomotor is terminated, the rotation of said servomotor being representative of the magnitude of said voltage being measured.

12. An analyzer comprising, in combination, a source of radiation, a sample cell through which radiation from said source is directed, means positioned in the path of radiation transmitted through said cell to establish an output voltage of magnitude proportional to the radiation transmitted through said cell, a first resistor, second and third resistors connected in series relation, the first terminal of said first resistor being connected to the junction between said second and third resistors, a first potentiometer, the end terminals of said first potentiometer being connected to respective end terminals of the series-connected said second and third resistors, a first voltage source and a fourth resistor connected in series relation, said series-connected first voltage source and fourth resistor being connected in parallel with said series connected second and third resistors, a second potentiometer, the contactor of said second potentiometer being connected to the contactor of said first potentiometer, a first variable resistor, the first end terminal of said variable resistor being connected to the first end terminal of said second potentiometer, a fifth resistor, one terminal of said fifth resistor being connected to the second end terminal of said second potentiometer, the second terminal of said fifth resistor being connected to the second end terminal of said first variable resistor, a second variable resistor, the first end terminal of said second variable resistor being connected to said second end terminal of said first variable resistor, a sixth resistor, the first terminal of said sixth resistor being connected to the second end terminal of said second variable resistor, a second voltage source applied between the second terminal of said sixth resistor and said second end terminal of said second potentiometer, said output voltage being applied across the second terminal of said first resistor and said second end terminal of said second potentiometer, a seventh resistor having its first terminal connected to said second terminal of said first resistor, a capacitor having its first terminal connected to the second terminal of said seventh resistor, the second terminal of said capacitor being connected to said second end terminal of said second potentiometer, means to vary the capacitance of said capacitor at a predetermined frequency, a servomotor coupled to the contactor of said second potentiometer, and means to energize said servomotor in response to the voltage across said capacitor whereby said servomotor moves the contactor of said potentiometer until rotation of said servomotor is terminated.

13. The combination in accordance with claim 12 further comprising a second servomotor coupled to the contactor of said first potentiometer, a third servomotor coupled to the arm of said first variable resistor, and switching means to connect said second and third servomotors selectively to said last-mentioned means in claim 12 in place of said first-mentioned servomotor whereby rotation of any one of said servomotors adjusts the circuit element coupled thereto until rotation of the servomotor is terminated.

14. Detecting apparatus to measure the magnitude of direct current voltages comprising, in combination, a first resistor, second and third resistors connected in series relation, the first terminal of said first resistor being connected to the junction between said second and third resistors, a first potentiometer, the end terminals of said first potentiometer being connected to respective end terminals of the series-connected said second and third resistors, a first voltage source and a fourth resistor connected in series relation, said series-connected first voltage source and fourth resistor being connected in parallel with said series connected second and third resistors, a second potentiometer, the contactor of said second potentiometer being connected to the contactor of said first potentiometer, a first variable resistor, the first end terminal of said variable resistor being connected to the first end terminal of said second potentiometer, a fifth resistor, one terminal of said fifth resistor being connected to the second end terminal of said second potentiometer, the second terminal of said fifth resistor being connected to the second end terminal of said first variable resistor, a second variable resistor, the first end terminal of said second variable resistor being connected to said second end terminal of said first variable resistor, a sixth resistor, the first terminal of said sixth resistor being connected to the second end terminal of said second variable resistor, a second voltage source applied between the second terminal of said sixth resistor and said second end terminal of said second potentiometer, said direct current voltage being applied across the second terminal of said first resistor and said second end terminal of said second potentiometer, a seventh resistor having its first terminal connected to said second terminal of said first resistor, a capacitor having its first terminal connected to the second terminal of said seventh resistor, the second terminal of said capacitor being connected to said second end terminal of said second potentiometer, means to vary the capacitance of said capacitor at a predetermined frequency, a servomotor coupled to the contactor of said second potentiometer, and means to energize said servomotor in response to the voltage across said capacitor whereby said servomotor moves the contactor of said potentiometer until rotation of said servomotor is terminated, the rotation of said servomotor being representative of the magnitude of said voltage being measured.

References Cited in the file of this patent
UNITED STATES PATENTS

| | | |
|---|---|---|
| 2,452,122 | Gumaer | Oct. 26, 1948 |
| 2,577,735 | Broomell | Dec. 11, 1951 |